United States Patent
Saxena et al.

(10) Patent No.: US 12,112,249 B2
(45) Date of Patent: Oct. 8, 2024

(54) MULTI-OBJECTIVE AUTOMATED MACHINE LEARNING

(71) Applicant: International Business Machines Corporation, Armonk, NY (US)

(72) Inventors: Vaibhav Saxena, Vasant Kunj (IN); Aswin Kannan, Chennai (IN); Saurabh Manish Raje, Gurgaon (IN); Parikshit Ram, Atlanta, GA (US); Yogish Sabharwal, Gurgaon (IN); Ashish Verma, Nanuet, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 974 days.

(21) Appl. No.: 17/115,673

(22) Filed: Dec. 8, 2020

(65) Prior Publication Data
US 2022/0180146 A1 Jun. 9, 2022

(51) Int. Cl.
*G06N 20/00* (2019.01)
*G06N 3/006* (2023.01)

(52) U.S. Cl.
CPC ............. *G06N 3/006* (2013.01); *G06N 20/00* (2019.01)

(58) Field of Classification Search
CPC ................................. G06N 20/00; G06N 3/006
See application file for complete search history.

(56) References Cited

U.S. PATENT DOCUMENTS

| | | | |
|---|---|---|---|
| 7,363,280 B2 | 4/2008 | Jin | |
| 7,395,235 B2 | 7/2008 | Dhurandhar | |
| 7,542,932 B2 | 6/2009 | Chalermkraivuth | |

(Continued)

FOREIGN PATENT DOCUMENTS

| | | |
|---|---|---|
| CN | 109670597 A | 4/2019 |
| CN | 110418354 A | 11/2019 |
| JP | 2007200302 A | 8/2007 |

OTHER PUBLICATIONS

Deb et al., "A Fast and Elitist Multiobjective Genetic Algorithm: NSGA-IL," IEEE Transactions on Evolutionary Computation, vol. 6, Issue: 2, Apr. 2002, Aug. 7, 2002, pp. 182-197. <https://ieeexplore.ieee.org/document/996017>.

(Continued)

*Primary Examiner* — Dave Misir
(74) *Attorney, Agent, or Firm* — Elliot J Shine

(57) ABSTRACT

A system, computer program product, and method are presented for performing multi-objective automated machine learning, and, more specifically, to identifying a plurality of machine learning pipelines as Pareto-optimal solutions to optimize a plurality of objectives. The method includes receiving input data directed toward one or more subjects of interest and determining a plurality of objectives to be optimized. The method also includes ingesting at least a portion of the input data through one or more machine learning (ML) models. The method further includes aggregating the plurality of objectives into one or more aggregated single objectives. The method also includes determining a plurality of Pareto-optimal solutions, thereby defining a plurality of ML pipelines that optimize the one or more aggregated single objectives. The method further includes selecting one ML pipeline from the plurality of ML pipelines.

23 Claims, 6 Drawing Sheets

(56) References Cited

U.S. PATENT DOCUMENTS

| | | |
|---|---|---|
| 7,630,928 B2 | 12/2009 | Bonissone |
| 7,640,201 B2 | 12/2009 | Chalermkraivuth |
| 8,126,795 B2 | 2/2012 | Bollapragada |
| 8,458,104 B2 | 6/2013 | Truemper |
| 8,515,777 B1 | 8/2013 | Rajasenan |
| 9,729,639 B2 | 8/2017 | Sustaeta |
| 2002/0099929 A1 | 7/2002 | Jin |
| 2004/0186804 A1 | 9/2004 | Chakraborty |
| 2005/0187846 A1 | 8/2005 | Subbu |
| 2013/0197878 A1 | 8/2013 | Fiege |
| 2018/0027055 A1 | 1/2018 | Balle |
| 2018/0053092 A1 | 2/2018 | Hajizadeh |
| 2019/0130897 A1 | 5/2019 | Zhou |
| 2019/0339669 A1 | 11/2019 | Coffman |
| 2019/0369607 A1 | 12/2019 | Enver |
| 2020/0074348 A1* | 3/2020 | Chelian .................. G06N 20/20 |
| 2020/0302342 A1* | 9/2020 | Cheng ..................... G06N 7/01 |
| 2021/0034924 A1* | 2/2021 | McCourt ............. G06F 18/2148 |

OTHER PUBLICATIONS

Jin et al., "Pareto-Based Multiobjective Machine Learning: An Overview and Case Studies," IEEE Transactions on Systems, Man, and Cybernetics, Part C (Applications and Reviews) (vol. 38, Issue: 3, May 2008), Apr. 18, 2008, pp. 397-415.

Liu et al., "An ADMM Based Framework for AutoML Pipeline Configuration," AAAI 2020, arXiv:1905.00424v5, Dec. 6, 2019, 30 pages. <https://arxiv.org/abs/1905.00424>.

Marler et al., "Survey of multi-objective optimization methods for engineering," Structural and Multidisciplinary Optimization 26, Mar. 23, 2004, 27 pages.

Mell et al., "The NIST Definition of Cloud Computing," Recommendations of the National Institute of Standards and Technology, U.S. Department of Commerce, Special Publication 800-145, Sep. 2011, 7 pages.

Michel et al., "DVOLVER: Efficient Pareto-Optimal Neural Network Architecture Search," arXiv:1902.01654v1, Feb. 5, 2019, 13 pages. <https://arxiv.org/abs/1902.01654>.

Pfisterer et al., "Multi-Objective Automatic Machine Learning with AutoxgboostMC," arXiv:1908.10796v1, Aug. 28, 2019, 15 pages. <https://arxiv.org/abs/1908.10796>.

Utyuzhnikov, "Multiobjective optimization: Quasi-even generation of pareto frontier and its local approximation," Handbook of Optimization Theory, Dec. 2010, 3 pages.

\* cited by examiner

MULTI-OBJECTIVE AUTOMATED MACHINE LEARNING

BACKGROUND

The present disclosure relates to performing multi-objective automated machine learning, and, more specifically, to identifying a plurality of machine learning pipelines as Pareto-optimal solutions to optimize a plurality of objectives.

Many known machine learning systems are configured to solve problems or resolve queries presented to them through optimizing a single objective. However, many problems and queries include more than one objective, and in some instances, the objectives may conflict with each other. Therefore, a potential solution for each individual objective may be generated, where only the single identified objective is sufficiently optimized, while the other objectives may, or may not, be optimized.

SUMMARY

A system, computer program product, and method are provided for performing multi-objective automated machine learning to optimize a plurality of objectives.

In one aspect, a computer system is provided for performing multi-objective automated machine learning to optimize a plurality of objectives. The system includes one or more processing devices and at least one memory device operably coupled to the one or more processing device. The one or more processing devices are configured to receive input data directed toward one or more subjects of interest and determine a plurality of objectives to be optimized. The one or more processing devices are also configured to ingest at least a portion of the input data through one or more machine learning (ML) models. The one or more processing devices are further configured to aggregate the plurality of objectives into one or more aggregated single objectives. The one or more processing devices are also configured to determine a plurality of Pareto-optimal solutions, thereby defining a plurality of ML pipelines that optimize the one or more aggregated single objectives. The one or more processing devices are further configured to select one ML pipeline from the plurality of ML pipelines.

In another aspect, a computer program product is provided for performing multi-objective automated machine learning to optimize a plurality of objectives. The computer program product includes one or more computer readable storage media, and program instructions collectively stored on the one or more computer storage media. The product also includes program instructions to receive input data directed toward one or more subjects of interest and program instructions to determine a plurality of objectives to be optimized. The product further includes program instructions to ingest at least a portion of the input data through one or more machine learning (ML) models. The product also includes program instructions to aggregate the plurality of objectives into one or more aggregated single objectives. The product further includes program instructions to determine a plurality of Pareto-optimal solutions, thereby defining a plurality of ML pipelines that optimize the one or more aggregated single objectives. The product also includes program instructions to select one ML pipeline from the plurality of ML pipelines.

In yet another aspect, a computer-implemented method is provided for performing multi-objective automated machine learning to optimize a plurality of objectives. The method includes receiving input data directed toward one or more subjects of interest and determining a plurality of objectives to be optimized. The method also includes ingesting at least a portion of the input data through one or more machine learning (ML) models. The method further includes aggregating the plurality of objectives into one or more aggregated single objectives. The method also includes determining a plurality of Pareto-optimal solutions, thereby defining a plurality of ML pipelines that optimize the one or more aggregated single objectives. The method further includes selecting one ML pipeline from the plurality of ML pipelines.

In another aspect, a computer-implemented method is provided for performing multi-objective automated machine learning to optimize a plurality of objectives. The method includes receiving input data directed toward one or more subjects of interest and determining a plurality of objectives to be optimized. The method also includes ingesting at least a portion of the input data through one or more machine learning (ML) models. The method further includes applying a first weight to a first objective of the plurality of objectives, and applying one or more second weights to one or more second respective objectives of the plurality of objectives. The first weight and the one or more second weights are selected through a uniform weight generation scheme. A sum of the first weight and the one or more second weights is unity. A first weighted objective and one or more second weighted objectives are generated. The method also includes aggregating the first weighted objective and the one or more second weighted objectives into a first weighted aggregated single objective. The method further includes determining a first Pareto-optimal solution from the first weighted aggregated single objective. The method also includes defining a first ML pipeline through the first Pareto-optimal solution. The first ML pipeline optimizes the first weighted aggregated single objective. The method further includes applying a third weight to the first objective of the plurality of objectives, and applying one or more fourth weights to the one or more second respective objectives of the plurality of objectives. The third weight and the one or more fourth weights are user-selected. A sum of the third weight and the one or more fourth weights is unity. The first weight is different from the third weight and the one or more second weights are different from the one or more fourth weights. A third weighted objective and one or more fourth weighted objectives are generated. The method also includes aggregating the third weighted objective and the one or more fourth weighted objectives into a second weighted aggregated single objective. The method further includes determining a second Pareto-optimal solution from the second weighted aggregated single objective. The method also includes defining a second ML pipeline through the second Pareto-optimal solution. The second ML pipeline optimizes the second weighted aggregated single objective. The method further includes selecting one ML pipeline from the first and second ML pipelines.

In yet another aspect, a computer-implemented method is provided for performing multi-objective automated machine learning to optimize a plurality of objectives. The method includes receiving input data directed toward one or more subjects of interest and determining a plurality of objectives to be optimized. The method also includes ingesting at least a portion of the input data through one or more machine learning (ML) models. The method further includes applying a first weight to a first objective of the plurality of objectives, and applying one or more second weights to one or more second respective objectives of the plurality of objectives. The first weight and the one or more second weights are automatically determined. A sum of the first weight and the one or more second weights is unity. A first weighted objective and one or more second weighted objectives are generated. The method also includes aggregating the first weighted objective and the one or more second weighted objectives into a first weighted aggregated single objective. The method further includes determining a first Pareto-optimal solution from the first weighted aggregated single objective, the first Pareto-optimal solution including one or more first objective values. The method also includes defining a first ML pipeline through the first Pareto-optimal solution. The first ML pipeline optimizes the first weighted objective and the one or more second weighted objectives. The method further includes applying a third weight to the first objective of the plurality of objectives, and applying one or more fourth weights to the one or more second respective objectives of the plurality of objectives. The third weight and the one or more fourth weights are automatically determined at least partially based on the one or more first objective values. A sum of the third weight and the one or more fourth weights is unity. The first weight is different from the third weight and the one or more second weights are different from the one or more fourth weights. A third weighted objective and one or more fourth weighted objectives are generated. The method also includes aggregating the third weighted objective and the one or more fourth weighted objectives into a second weighted aggregated single objective. The method further includes determining a second Pareto-optimal solution from the second weighted aggregated single objective. The method also includes defining a second ML pipeline through the second Pareto-optimal solution. The second ML pipeline optimizes the third weighted objective and the one or more fourth weighted objectives. The method further includes selecting one ML pipeline from the first and second ML pipelines.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
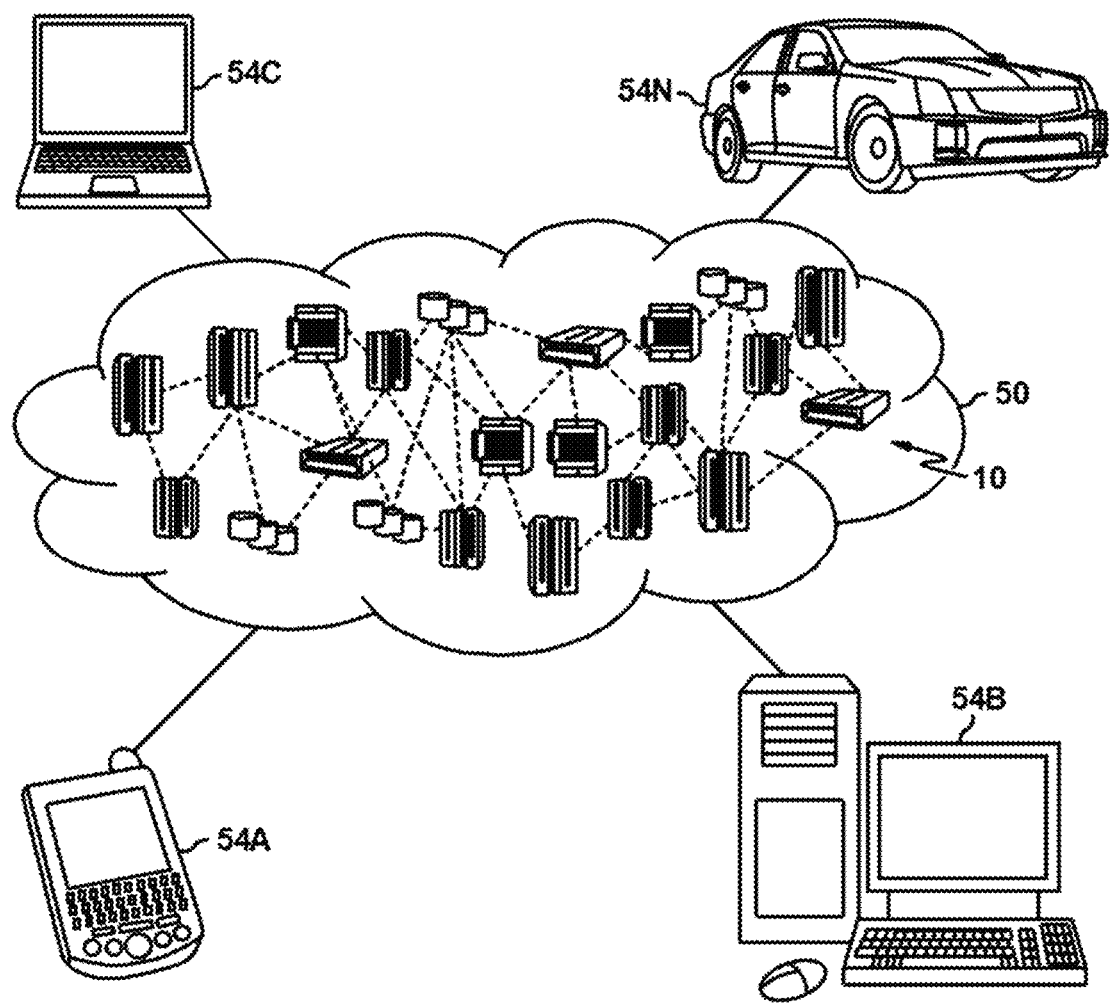
FIG. 1 is a schematic diagram illustrating a cloud computing environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments. In addition, it will be appreciated that, although specific embodiments have been described herein for purposes of illustration, various modifications may be made without departing from the spirit and scope of the embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
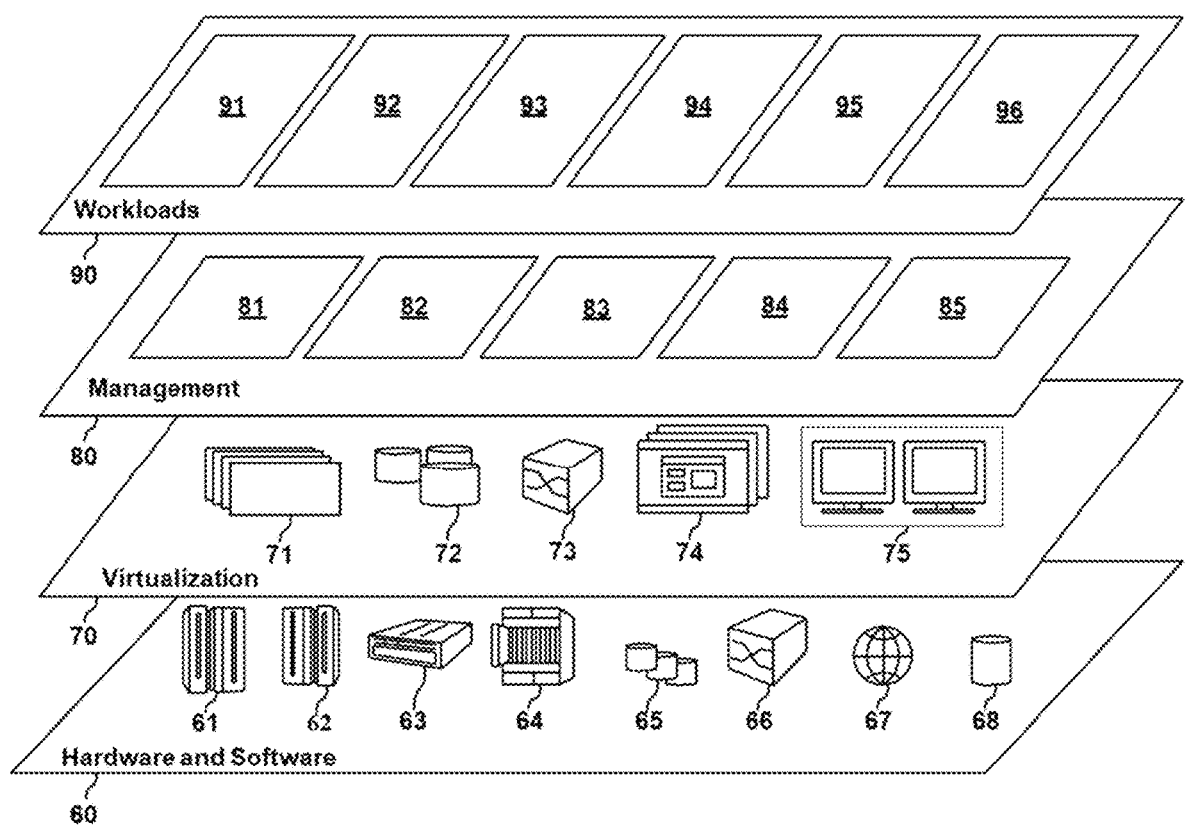
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-objective automated machine learning 96.

Figure 3:
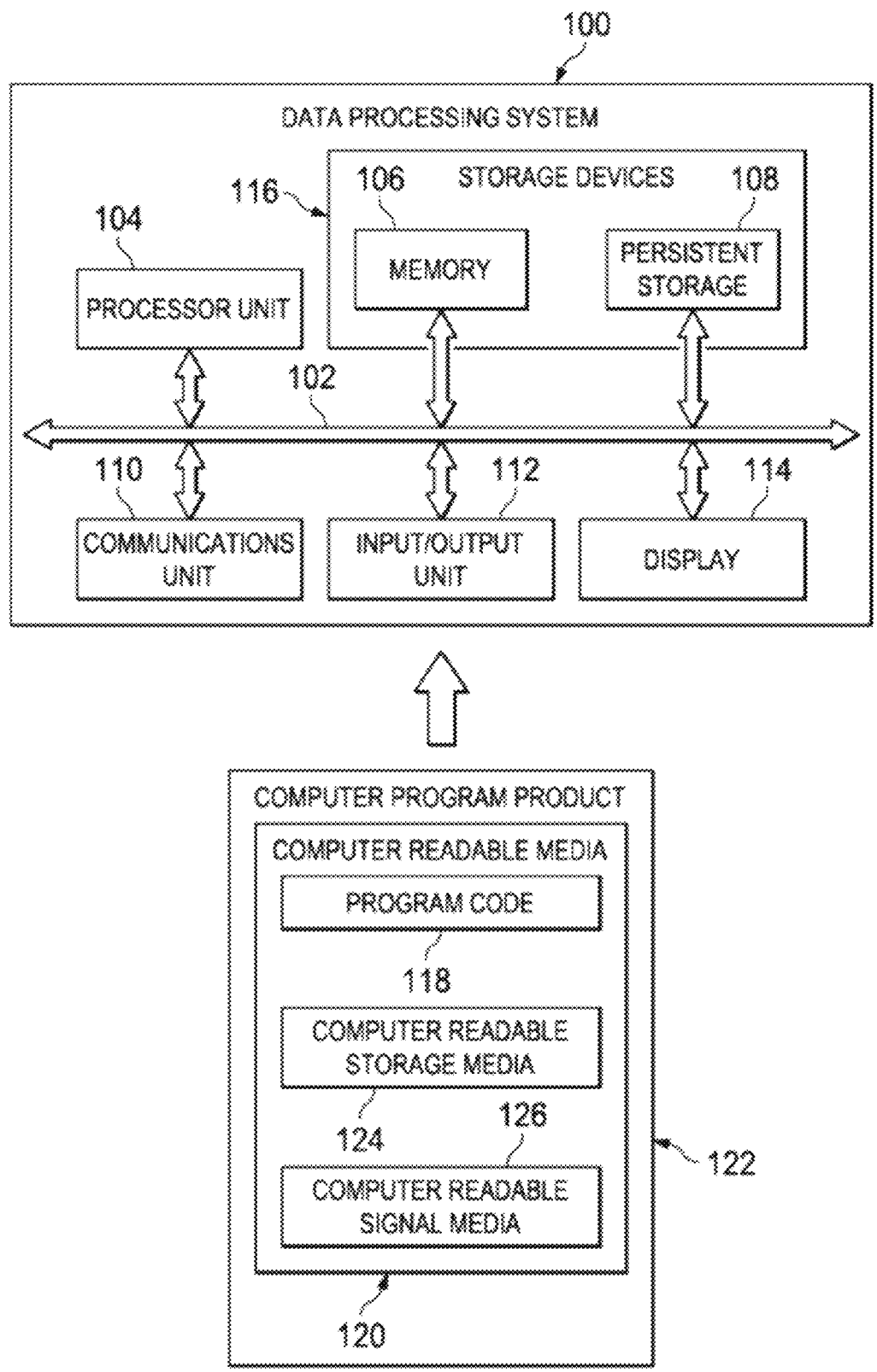
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100, is provided. The computer system 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104 (sometimes referred to as processors and processing units), e.g., hardware processors, a system memory 106 (sometimes referred to as a memory device), and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multiprocessor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many known machine learning (ML) systems are configured to solve problems, resolve queries presented to them, or generate predictions of particular outcomes through optimizing a single objective. Optimization of objectives frequently includes either maximizing or minimizing the results directed toward the objectives. However, many problems and queries include more than one objective, and in some instances, the objectives may conflict with each other. For example, a credit card transaction system may attempt to simultaneously optimize the accuracy of distinguishing between legitimate transactions versus fraudulent transactions, while also optimizing the number of false positives (classifying fraudulent transactions as legitimate), and the number of false negatives (classifying legitimate transactions as fraudulent), where the costs of false positives may outweigh the costs of false negatives (typically resulting in customer dissatisfaction with the service). In such an example, it may be desired to maximize the results of distinguishing between fraudulent and legitimate transactions, while minimizing the number of false negatives and false positives. However, in at least some instances, a business entity may elect to optimize the number of false negatives to the detriment of optimizing the number of false positives. Therefore, a potential solution for each individual objective may be generated, where only the single identified objective is sufficiently optimized, while the other objectives may, or may not, be optimized. Other examples of objectives of interest include robustness of computing functions, computing efficiency, time to generate a prediction, and particular user- and/or domain-specific objectives. Therefore, the resulting plurality of single-objective-based solutions may conflict with each other and attempts to reconcile the multiple solutions to obtain an optimal solution for all objectives may not actually provide the optimized objectives for each as desired. Accordingly, optimization methods considering only a single objective from the plurality of objectives may not provide optimal solution when optimizing a plurality of objectives simultaneously.

In general, multi-objective optimization problems that involve more than one objective function that need to be optimized simultaneously may have a mathematical formulation of:

$$\text{Min} F(x) = [f_1(x), f_2(x), \ldots f_M(x)], \text{over } x = [x_1, x_2, \ldots x_n],$$

where F(x) is an expression of one or more objective values extending over a domain of x, and the optimization problem Min F(x) is solved through an algorithm that is configured to determine the solutions yielding minimum values for each f(x), where each f(x) is an objective function, and each x represents an optimization parameter, referred to as a decision vector, and F(x) and each x are vectors. There may be M objective functions and n optimization parameters, where M and n are integers, and in some embodiments, M=n. In general, for a generic multi-objective problem (non-ML specific), the solutions are searched over the set of decision vectors (x) such that each component $x_i$ of the decision vector x falls within the feasible region. Therefore, each Pareto-optimal solution is a decision vector which optimizes F(x), and the decision vectors x are input vectors and F(x) is the output vector. In the case of the multi-objective ML problem that is to be solved, and as described further herein, each decision vector x denotes a ML pipeline determined by the choice of data transformers and ML model together with their hyperparameters. Hyperparameters are parameters that are provided by the user before training the ML model. These hyperparameters are known prior to the initiation of ML model training and remain fixed throughout the model training and are therefore not learned during the ML model training. Therefore, in the ML case, each Pareto-optimal solution denotes a particular unique ML pipeline. For example, referring again to the credit card transaction discussion, it will be desired to minimize overall transactions classification errors ($f_1(x)$) (or, in other words, maximize transaction classification accuracy), minimize false positive rates ($f_2(x)$), and minimize false negative rates ($f_3(x)$).

In addition, the optimization problem may also be subject to conditions such as:

$$g(x) \le 0; h(x) = 0; \text{ and } x_i^{lower} < x_i < x_i^{upper}, I=1,2,3,\ldots,n,$$

where g(x) and h(x) are independent functions of x and the feasible region of $x_i$ is defined with an upper bound and a lower bound. Accordingly, a single-objective ML system may not be able to find a solution to the Min F(x) optimization problem because the objective functions f(x) may be mutually exclusive for the bounded set of x and the established conditions, where there is no instance, i.e., solution of decision vectors x that will meet all of the requirements to optimize all three of the objective functions $f_1(x)$, $f_2(x)$, and $f_3(x)$, and three vastly different values of x may result for each of the three individual objective function optimization attempts.

At least some known automated machine learning systems include one or more machine learning pipelines, each ML pipeline defined by one or more transformers and one or more ML models. A sequence of transformers are configured to execute data preparation prior to injection into the one or more ML models. Such data preparation includes, without limitation, data preprocessing, extracting, filtering, backfilling, and creating useful features from raw input data. For example, some of such raw data may be unusable as it is ingested in the respective ML pipeline and will need to be either extracted or modified into a useful form. Also, some data may be missing and will need to be backfilled. Some values may be categorized, e.g., gender which is typically not a numerical value, and the respective model may not be able to work with non-numerical values. Further, some ingested features may not be useful and they can be either dropped or some features may need to be combined to improve the predictive model performance. Some known automatic ML systems execute some form of multi-objective optimization through ML models without considering the full ML pipeline, i.e., the data transformation steps are not included in the optimizations.

The ML models may be one or more of a classifier or a regressor to generate the respective predictions. Some known machine learning systems configured for single objective optimization may lead to a sub-optimal machine learning model due to the imbalanced nature of the input data or may yield poor values for other objectives due to focus on only a single objective. For example, a classifier optimizing only classification accuracy may make for a poor model selection when the input data has the majority of the respective samples from only a single class of interest. Further, neglecting some of the data may be required to use the ML model, however, such data removal may skew the input data to the ML model, which in turn may skew the predictions resulting from the ML model.

Some known mechanisms to perform multi-objective optimization include generating multiple optimization solutions and evaluating the solutions through analyzing the dominance thereof. Specifically, dominance is used to determine the quality of the solutions where a first solution is said to dominate a second solution if the first solution is better than or at least equal to the second solution in all objectives, and the first solution is strictly better than the second solution in at least one objective. Those solutions which are not dominated by any of the other solutions in light of all of the objectives are referred to as a Pareto-optimal solutions through Pareto optimization, i.e., Pareto-optimal solutions are non-dominated solutions and no other solution dominates them. The set of outcomes (objective values) obtained from all of the Pareto-optimal solutions graphically defines a Pareto-front, sometimes referred to as a Pareto-frontier. This Pareto-front may be shown graphically to analyze the objective values. Some known multi-objective optimization ML systems use a Pareto-optimal analysis, however, such systems do not search over ML pipelines as described herein, that is, they do not include both data transformers and model when searching. Moreover, such known Pareto-based multi-objective optimization ML systems that ignore transformers may demonstrate difficulty in estimating a good Pareto-front within established computing budgets, temporal budgets, and with the desired number of points on the Pareto-front. In multi-objective optimization ML systems that include the pipelines as described herein, large search spaces may exist to search through for gathering the necessary data for processing and such systems may have a large number of algorithms to select from to perform one or more operations. Moreover, many known multi-objective optimization ML systems cannot execute optimization operations on "opaque box" objectives that may be user-generated, since the details of the operations and functions therein are typically not visible.

A system, computer program product, and method are disclosed and described herein directed toward performing multi-objective automated machine learning to optimize a plurality of objectives. In one or more embodiments, data intended to be used as input to a machine learning (ML) model for solving problems, resolving queries presented to them, or generating predictions of particular outcomes is input to a multi-objective joint optimization system. In addition, a set of objectives to be attained, i.e., objectives of interest, are input into the multi-objective joint optimization system. Typically, the objectives will be to either minimize or maximize the respective outcomes. In some embodiments, custom objectives such as robustness and fairness measures of a result are used. Also, in some embodiments, domain-specific custom objectives may be used. Moreover, in some embodiments, one or more opaque box objectives may be used. In general, a transparent box is an objective where the functional or analytical form of the objective function $f(x)$ is known. For example, if a function is defined requiring a 2-dimensional input vector similar to $F((x_1, x_2))=[x_1^2+sqrt(x_2)]$, then the functional form of this function is known. However, for opaque box objectives, such functional formulations are not known. This is typical in instances of ML problems where the objective functions $f(x)$ do not have any functional form. In such instances, the model is initially trained on some training dataset, then the objective function $f(x)$ is evaluated, e.g., and without limitation, classification accuracy, by making predictions using the model and then determining the accuracy. In some cases, a user may define and provide an opaque box objective function $f(x)$ where only the inputs are injected and the output values are obtained without concern about the implementation of the user-provided objective function $f(x)$. Accordingly, any inputted objectives that enable operation of the multi-objective joint optimization system as described herein are used.

In one or more embodiments, user-selectable model optimization parameters are also input to the multi-objective joint optimization system, where such model optimization parameters may be user-selected constraints, including, without limitation, computational or processing time. Further, a collection of transformers and models is assembled. In addition, one or more standard evaluation metrics may be used, such as, and without limitation, accuracy, precision, recall, false positive rate (FPR), Matthews correlation coefficient (MCC), and area under receiver operating characteristics curve (AUROC).

In at least one embodiment, the one or more ML pipeline search spaces are built. The ML pipeline search spaces include a plurality of components that will be used to define a plurality of ML pipelines as described further herein. The components include a plurality of data transformers, hyperparameters, and one or more ML models that will be sequentially arranged to define the respective ML pipelines. A weighted aggregation of a plurality of objectives are combined into a single objective. For example, a scheme which pre-computes weights over a uniform grid that results in a uniform application of the weights may be used. Alternatively, an adaptive scheme for dynamically, and objectively, computing the weights based on the returned objective values (discussed further herein). In general, the adaptive scheme internally determines the initial set of weights which are then dynamically updated based on the objective values, i.e., these weights are not user provided. In some embodiments, the initial weights are determined through generating a coarse grid in an n-dimensional space. In some embodiments, the initial weights may be determined based on the best and worst case values of the "individual" objective functions f(x) that are optimized one at a time, i.e., not on a weighted sum. In some embodiments, in addition to the aforementioned weighting schemes, the weighting factors may be input by the user as user-specified custom objective weights based on a relative importance of the objectives. Regardless of the origin of the weighting factors, the sum of the weighting factors must equal unity, i.e., one. Accordingly, the weights facilitate transforming the multi-objective problem to a single-objective formulation by performing a weighted aggregation of multiple objectives into a combined/aggregated single objective, thereby facilitating alignment of the transformers, hyperparameters, and models in the ML pipeline search space for a single objective.

In some embodiments, the aggregated single objective is transmitted to a single objective joint optimizer that is configured to define a unique ML pipeline to optimize each aggregated single objective through a single objective optimizer, e.g., and without limitation, Alternating Direction Method of Multipliers (ADMM), and optimizing the hyperparameters of the transformers and the model. Accordingly, the multiple objectives are aggregated into a single objective, where the single objective joint optimizer solves the multi-objective optimization problem, and the components of the ML pipeline that will define the optimum ML pipeline for generating the results are identified.

A selectable number of iterations are performed such that a Pareto-front is generated. The Pareto-front includes the plurality of objective values F(x), i.e., the optimized numerical values associated with each point on the Pareto-front resulting from optimizing the respective aggregated single objective. For example, for the set of x, i.e., $\{x^1, x^2, \ldots x^k\}$ that denotes the set of Pareto-optimal solutions, then the Pareto-front includes the set of objective values on these Pareto-optimal solutions. As such, the Pareto-front will be defined by the set of $\{F(x^1), F(x^2), \ldots F(x^k)\}$, where each objective value F(x) is a vector of objectives that need to be optimized (i.e., maximized or minimized). For example, in the instance of the bi-objective problem, each objective value F(x) is a vector $[f_1(x), f_2(x)]$, and the points can be plotted as a two-dimensional graph representing the Pareto-front. Therefore, as used herein, the objective value refers to those values of F(x) of the Pareto-optimal solutions. In some embodiments, the weights on the next iterative run may be adjusted either through the uniform weights, through adaptive weighting as a function of the previous objective values, or through user-selected weights. Each time the weights are changed, i.e., for each iterative run through the multi-objective joint optimizer, a different unique ML pipeline for a different aggregated single objective is determined to generate a different set of objective values. Specifically, the transformers and their associated hyperparameters, as well as the ML model will likely change, thereby facilitating defining multiple unique ML pipelines.

In one or more embodiments, the Pareto-front curve is generated and provided to the user through a graphical user interface for the user's inspection and selection. The user will select the solution that provides the desired objective values. The associated ML pipelines will be identified based on the selected solution. In some instances, the user may want to optionally further refine the Pareto-front such that more solutions can be obtained within a portion of the generated Pareto-front curve. A desired region of the Pareto-front curve is selected through identifying additional constraints for the multi-objective optimization. If the single objective joint optimizer supports the constraints, the process will operate as described above and generate additional points on the Pareto-front curve within the constraints provided and with the weighting scheme previously described. If the single objective joint optimizer does not support the constraints, then one or more graduated penalty terms are added to the old aggregated single objectives to generate new objectives in the event that the constraints are violated as a function of the magnitude of the constraint violation. Therefore, only those pipelines that violate the constraints are penalized such that only those pipelines satisfying the constraints on the objective values are obtained. Accordingly, refinement of the resultant Pareto-curve is facilitated.

Figure 4:
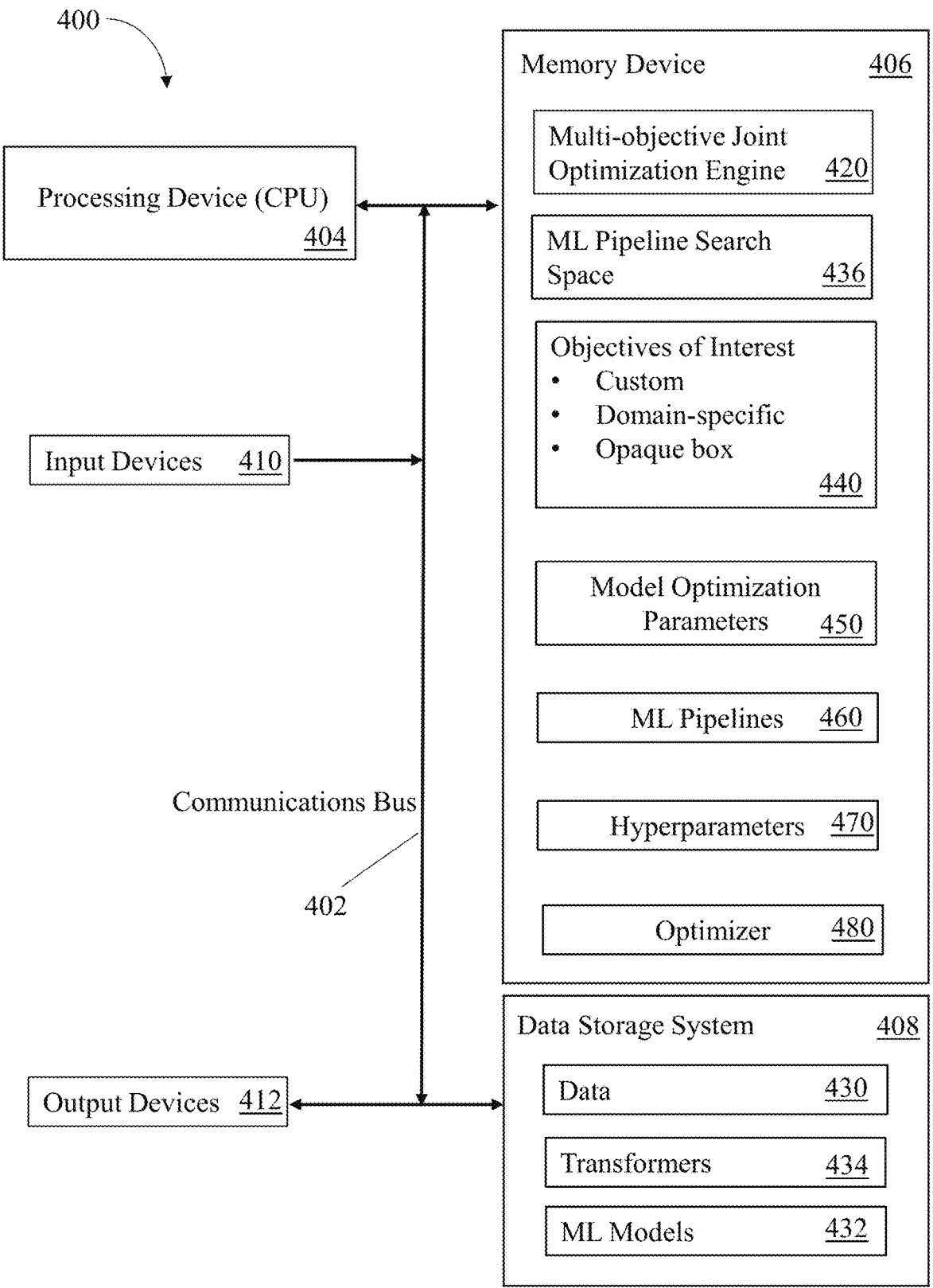
FIG. 4 is a block diagram illustrating a computer system configured to use multi-objective automated machine learning to optimize a plurality of objectives, in accordance with some embodiments of the present disclosure.

Referring to FIG. 4, a block diagram is presented illustrating a computer system, i.e., a multi-objective automated machine learning system 400 (hereon referred to as the MOAML system 400) configured to use performing multi-objective automated machine learning, and, more specifically, to identifying a plurality of machine learning pipelines as Pareto-optimal solutions to optimize a plurality of objectives. The MOAML system 400 includes one or more processing devices 404 (only one shown) communicatively and operably coupled to one or more memory devices 406 (only one shown). The MOAML system 400 also includes a data storage system 408 that is communicatively coupled to the processing device 404 and memory device 406 through a communications bus 402. In one or more embodiments, the communications bus 402, the processing device 404, the memory device 406, and the data storage system 408 are similar to their counterparts shown in FIG. 3, i.e., the communications bus 102, the processing device 104, the system memory 106, and the persistent storage devices 108, respectively. The MOAML system 400 system further includes one or more input devices 410 and one or more output devices 412 communicatively coupled to the communications bus 402.

In one or more embodiments, a multi-objective joint optimization engine 420 is resident within the memory device 406. The multi-objective joint optimization engine 420 is discussed in detail further in this disclosure. The remainder of the items in the memory device 406 and the data storage system 408 are discussed further with respect to FIG. 5.

Figure 5:
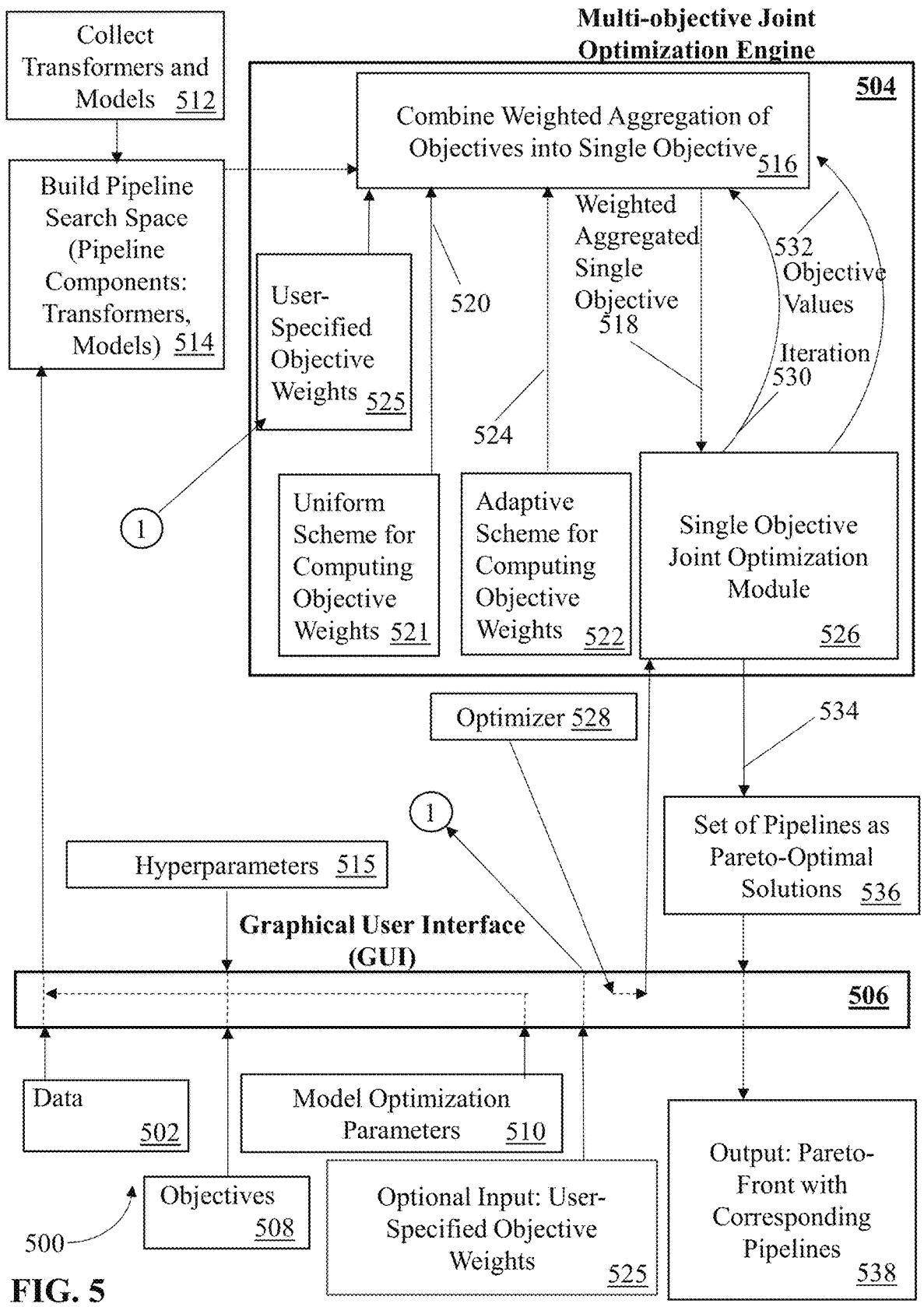
FIG. 5 is a flowchart illustrating a process for performing multi-objective automated machine learning to optimize a plurality of objectives, in accordance with some embodiments of the present disclosure.

Referring to FIG. 5, a flowchart is provided illustrating a process 500 for performing multi-objective automated machine learning to optimize a plurality of objectives. Also referring to FIG. 4, in one or more embodiments, input data 502 intended to be used as input to one or more machine learning (ML) models 432 for solving problems, resolving queries presented to them, or generating predictions of particular outcomes is input to, i.e., ingested by the multi-objective joint optimization engine 504 (shown as 420 in FIG. 4). The multi-objective joint optimization engine 504 is referred to hereon as the engine 504, and is discussed in detail further in this disclosure. In one embodiment, the data 502 is input into the engine 504 as data 430 from the data storage system 408. In some embodiments, the data 502 in input into the engine 504 through one or more of the input devices 410, such as, and without limitation, a graphical user interface, or GUI 506.

In addition, in some embodiments, a set of objectives 508 to be attained, sometimes referred to as objectives 508 of interest (shown as 440 in FIG. 4), are input into the engine 504 through the GUI 506. Typically, the objectives 508 will be to either minimize or maximize the respective outcomes. In some embodiments, custom objectives such as robustness and fairness measures of a result are used. Also, in some embodiments, domain-specific custom objectives may be used. Moreover, in some embodiments, one or more opaque box objectives may be used. In general, a transparent box is an objective where the functional or analytical form of the objective function $f(x)$ is known, or in some instances, does not exist. For example, if a function is defined requiring a 2-dimensional input vector similar to $F((x_1, x_2))=[x_1^2+\text{sqrt}(x_2)]$, then the functional form of this function is known. However, for opaque box objectives, such functional formulations are not known. This is typical in instances of ML problems where the objective functions $f(x)$ do not have any functional form. In such instances, the respective ML model 432 is initially trained on some training dataset, then the objective function $f(x)$ is evaluated, e.g., and without limitation, classification accuracy, by making predictions using the ML model 432 and then determining the accuracy. In some cases, a user may define and provide an opaque box objective function $f(x)$ where only the inputs are injected and the output values are obtained without concern about the implementation of the user-provided objective function $f(x)$. Accordingly, any inputted objectives 508 that enable operation of the MOAML system 400 as described herein are used.

In one or more embodiments, user-selectable model optimization parameters 510 (shown as 450 in FIG. 4) are also input to the engine 504, where such model optimization parameters 510 may be user-selected constraints, including, without limitation, computational or processing time. Further, one or more data transformers and ML models are collected 512 (where the ML models and the transformers are labeled 432 and 434, respectively, in FIG. 4) and a ML pipeline search space 436 is built 514 through populating the ML pipeline search space 436 with the textual names of the ML models 432 and transformers 434 that can be used for creating the ML pipelines. The ML models 432 and transformers 434 are components that will be selected to define a plurality of ML pipelines (shown in FIG. 4 as 460). Specifically, in some embodiments, the collection operation 512 includes choosing a subset of transformers 434 and ML models 432 from a pre-defined collection (library) of known transformers and models that can be used for multi-objective optimization problem and the building operation 514 is configured to populate to the search space 436 using the transformers 434 and ML models 432 from this subset. In addition, ML pipeline components include a plurality of user-selected hyperparameters 515 (shown as 470 in FIG. 4) to further define the respective ML pipelines 460. Moreover, in some embodiments, one or more standard evaluation metrics may be selected to enhance the operations described herein, including, without limitation, accuracy, precision, recall, false positive rate (FPR), Matthews correlation coefficient (MCC), and area under receiver operating characteristics curve (AUROC).

In at least some embodiments, a weighted aggregation of the plurality of objectives 508 are combined 516 into a single objective, thereby facilitating multi-objective joint optimization as described herein through weighted aggregation of multiple objectives 508 into a weighted aggregated single objective 518. In general, the objectives are expressed as F={$f_1, f_2, \ldots f_n$} and the objective weighting factors are expressed as W={$w_1, w_2, \ldots w_n$}, where n is an integer, a set S of Pareto-optimal solutions will be generated, where there are N Pareto-optimal solutions in the set S, where there is no relationship between the number of Pareto-optimal solutions (N) and the number of objective functions or number of weights (n). Also, in general, using the numeral 2 for n best facilitates illustrating the features of the processes described; however, any number for n that facilitates operation of the multi-objective joint optimization engine 504 may be used.

In some embodiments, the objective weighting factors, also referred to as the uniform scheme objective weights 520 (referred to hereon as the uniform objective weights 520), e.g., $w_1$ and $w_2$, are input through a uniform scheme 521 for computing the uniform objective weights 520. For example, and without limitation, the scheme 521 which pre-computes the specified objective weights 520 over a uniform grid results in a uniform application of the objective weights 520. Accordingly, the weights 520 for each of the objectives 508 may be automatically selected as provided by the uniform scheme 521.

In some embodiments, an adaptive scheme 522 is used for dynamically, adaptively, and objectively computing engine-generated objective weights 524 based on the returned objective values (discussed further herein). In general, the adaptive scheme 522 internally determines the initial set of weights which are then dynamically updated to generate adaptive weights based on the objective values. The initial weights and the subsequent adaptively-generated weights (discussed further herein) are jointly referred to as adaptive weights 524. In some embodiments, the initial weights are determined through generating a coarse grid in an n-dimensional space. In some embodiments, the initial weights may be determined based on the best and worst case values of the "individual" objective functions f(x) that are optimized one at a time, i.e., not on a weighted sum. Accordingly, the adaptive weights 524 for each of the objectives 508 may be automatically system-generated, and any mechanism for initial weight selection that enables operation of the multi-objective joint optimization engine 504 may be used.

In some embodiments, the objective weighting factors may also include user-specified objective weights 525 (shown twice in FIG. 5 for clarity) in addition to the uniform objective weights 520 and the adaptive weights 524 as an option. The user-specified objective weights 525 may be input by the user through the GUI 506 based on a relative importance of each objective 508. Accordingly, the weights 525 for each of the objectives 508 may be user-selected based on the user's determinations of the relative importance of each objective 508, and any mechanism for user-weight selection that enables operation of the multi-objective joint optimization engine 504 may be used.

In at least some embodiments, the weighted aggregated single objective 518 is transmitted to a single objective joint optimization module 526 configured to define a ML pipeline 460 to optimize each aggregated single objective. In some embodiments, the weighted aggregated single objective 518 has a formulation of f_ag=$w_1*f_1(x)+w_2*f_2(x)+ \ldots +w_n*f_n(x)$. In some embodiments, the aggregated single objective 518 is optimized through a single objective optimizer 528 (shown as 480 in FIG. 4), e.g., and without limitation, Alternating Direction Method of Multipliers) (ADMM), and determines the transformers 434, the ML models 432, and the hyperparameters 470 thereof. Any optimizer 528 that enables operation of the MOAML system 400 may be used. In some embodiments, multiple optimizers 528 may be used.

In general, for machine learning, hyperparameter optimization or hyperparameter tuning is associated with the problem of choosing a set of optimal hyperparameters for a learning algorithm. As described above, a hyperparameter is a parameter whose value is used to control the learning process. Presented for contrast only, the values of other parameters, e.g., typically node weights, are learned. The same kind of machine learning models can require different constraints, weights, or learning rates to generalize different data patterns. These measures may be the hyperparameters, and the hyperparameters have to be tuned so that the model can optimally solve the machine learning problem presented thereto. Hyperparameter optimization finds a tuple of hyperparameters that yields an optimal model which minimizes a predefined loss function on given independent data.

In one or more embodiments, the multiple objectives $f_i$ that are aggregated into the weighted aggregated single objective 518 are processed through the one or more algorithms 528 to solve the multi-objective optimization problem, e.g., and without limitation, Min F(x)=[$f_1(x), f_2(x), \ldots f_M(x)$], over x=[$x_1, x_2, \ldots x_n$]. For the example embodiment, the multi-objective optimization problem involving two objectives 508 is formulated as the bi-objective optimization problem Min F(x)=[$f_1(x), f_2(x)$], over x=[$x_1, x_2, \ldots x_n$], where M=2 for the two objectives 508 being solved for. The algorithm 528 proceeds to solve the multi-objective optimization problem toward identifying the components of the ML pipeline 460 that will define the optimum ML pipeline 460 for generating the desired results through alignment of the transformers 434, hyperparameters 470, and ML models 432 in the ML pipeline search space 436 for a single objective as described further. In one embodiment, the arrangement of the transformers 434, the hyperparameters 470, and the ML models 432 may take the form of: $T_1(hp_1) \rightarrow T_2(hp_2) \rightarrow T_3(hp_3) \rightarrow M(hp_4)$, where the transformers, the hyperparameters, and the model are represented by $T_i$, $hp_i$, and M, respectively.

Figure 6:
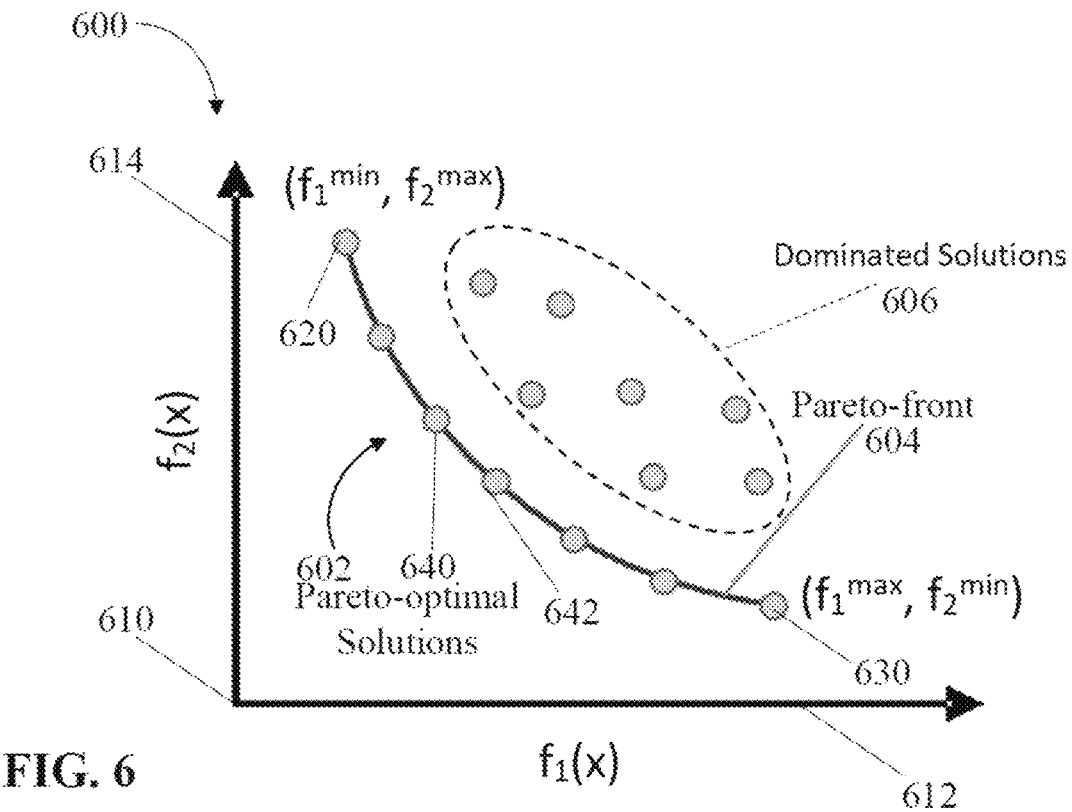
FIG. 6 is a graphical representation illustrating a set of Pareto-optimal solutions and corresponding Pareto-front optimizing chosen objectives, in accordance with some embodiments of the present disclosure.

The single objective joint optimization module 526 aligns the transformers 434, hyperparameters 470, and ML models 432, but for only a single objective. Therefore, in some embodiments, an iterative process will be used. As such, the first iteration through the single objective joint optimization module 526 generates a first solution of the multi-objective optimization problem. Referring to FIG. 6, a graphical representation 600 is presented illustrating a set of Pareto-optimal solutions 602, a corresponding Pareto-front 604 optimizing the user-chosen objectives 508, and a plurality of dominated (non-optimal) solutions 606. The graphical representation 600 includes an origin 610 as defined by an intersection of an abscissa (X-axis) 612 that represents the values of the solution $f_1(x)$ for the single objective $f_1$ and an ordinate (Y-axis) 614 that represents the values of the solution $f_2(x)$ for the single objective $f_2$. For example, a first Pareto-optimal solution 620 on the Pareto-front 606 incudes the objective values F(x) where the first objective is minimized ($f_{1,min}$) and the second objective is maximized ($f_{2,max}$). In contrast, a second Pareto-optimal solution 630 on the Pareto-front 606 includes the objective values F(x) where the first objective is maximized ($f_{1,max}$) and the second objective is minimized ($f_{2,min}$). Notably, neither first Pareto-optimal solution 620 nor second Pareto-optimal solution 630 provide the two objectives of a solution yielding minimum values for each objective function of $f_1(x)$ and $f_2(x)$. However, each of the first Pareto-optimal solution 620 and the second Pareto-optimal solution 630 have attained minimization of one of the objective functions $f_1(x)$ and $f_2(x)$, thereby at least partially defining the Pareto-front 604. Also, notably, none of the dominated solutions 606 have met any of the objectives toward minimizing both objective functions $f_1(x)$ and $f_2(x)$ and are shown for comparison purposes only in that the processes described herein do not generate such dominated solutions 606. Each of the first Pareto-optimal solution 620 and the second Pareto-optimal solution 630 include the associated components of the respective ML pipelines 460 including the respective transformers 434, hyperparameters 470, and ML models 432. Accordingly, the respective ML pipeline 460 resolved in the initial solution may not be acceptable to the user.

Continuing to refer to FIGS. 4-6, the description of FIG. 6 provides the results of multiple iterations of the single objective joint optimization operation as executed by the single objective joint optimization module 526, which implies that multiple iterations beyond the initial iteration will likely be necessary to determine the optimum objective value F(x). Therefore, in one or more embodiments, a selectable number of iterations 530 are performed such that the Pareto-front 604 is generated. Specifically, the weighted aggregation of the objectives 508 combination operation 516 through the single objective joint optimization module 526 are executed a predetermined number of iterations 530, where, in some embodiments, the number of iterations N is bounded by the allotted processing time and/or the compute budget to generate N Pareto-optimal solutions 602 to define the Pareto-front 604.

As described above, in some embodiments, a set of objective values $f_1(x)$ and $f_2(x)$ are generated though each iteration 530, and the respective unique ML pipelines 460 are defined. For those embodiments that employ the user-specified objective weights 525, the user-specified objective weights 525, i.e., $w_y$ and $w_z$ that were input by the user to change the weighted aggregated single objective 518 through the formulation of $f\_ag = w_y * f_1(x) + w_z * f_2(x)$, where the objective functions $f_1(x)$ and $f_2(x)$ remain unchanged. Note that the user-specified objective weights $w_y$ and $w_z$ may be used after at least one iteration of the uniform scheme 521 or the adaptive scheme 522. The user-specified objective weights 525 $w_y$ and $w_z$ are changed for every additional iteration 530 such that the weighted aggregated single objective 518, the values of the objectives $f_1(x)$ and $f_2(x)$, and the resultant unique ML pipeline 460 are changed as well. As a non-limiting example, in the instance of the bi-objective problem, the weighted aggregated single objective 518 through the formulation of $f\_ag = w_y * f_1(x) + w_z * f_2(x)$ has a modified formulation $f\_ag = w_y * f_1(x) + (1-w_y) * f_2(x)$ (the sum of $w_y$ and $w_z$ is unity), and the values of $w_y$ for each of four planned additional iterations 530 are 0.00, 0.33, 0.66, 1.00 to generate 4 ML pipelines 460 with 4 Pareto-optimal solutions 602.

Referring again to FIGS. 4-6, for those embodiments that use the adaptive scheme 522 for computing objective weights the objective values F(x) 532 (=[$f_1(x)$, $f_2(x)$] for the bi-objective case) generated by the single objective joint optimization module 526 are fed-back to the weighted aggregation of the objectives 508 combination operation 516 where the adaptive scheme 522 uses the objective values F(x) 532 to calculate the weights for the next iteration of combining the objectives and generating the objective values 532 and the respective ML pipeline 460. In general, the results obtained through user-specified objective weights 525 augments the results obtained through the uniform scheme 521 or the adaptive scheme 522.

As discussed above, in one embodiment, the arrangement of the transformers 434, the hyperparameters 470, and the ML models 432 may take the form of: $T_1(hp_1) \rightarrow T_2(hp_2) \rightarrow T_3(hp_3) \rightarrow M(hp_4)$, where the transformers, the hyperparameters, and the model are represented by $T_i$, $hp_i$, and M, respectively. Specifically, the single objective joint optimizer 528, such as, without limitation, ADMM determines the exact algorithms used for the transformers 434 and ML models 432 and the associated hyperparameters 515 used for these transformers 434 and ML models 432. The single objective joint optimization module 526 will use the optimizer 528 to determine the exact algorithms used for $T_1$, $T_2$, $T_3$ and M out of the available choices. Similarly, the optimizer 528 will determine the exact hyperparameters $hp_1$, $hp_2$, $hp_3$ and $hp_4$ used for these transformers 434 and ML models 432 through hyperparameter optimization (HPO), inside the single objective joint optimization module 526. Just as an example, if there are 3 choices of algorithms for model M, (1) DecisionTree, (2) RandomForest, and (3) GradientBoosting, then the single objective joint optimization module 526 will use the optimizer 528 to determine the exact algorithm that will be used as model M in the pipeline.

Changing the weighting factors as described for the user-specified objective weights 525, the uniform scheme 521, and the adaptive scheme 522 may have the effect of altering one or more of the respective transformers 434, the model 432, and/or the hyperparameters 470 of each, thereby generating a different unique ML pipeline 460 than any of the previous iterations, and in at least some cases, subsequent ML pipelines 460 after the present iteration and the respective ML pipeline 460.

Continuing to refer to FIGS. 4-6, an output 534 of the iterative process executed by the multi-objective joint optimization engine 504 includes the objective values 532 and a set of pipelines 536 as the Pareto-optimal solutions 602. More specifically, the selectable number of iterations are performed such that the Pareto-front 604 is generated. The Pareto-front 604 includes the plurality of objective values F(x), i.e., the optimized numerical values associated with each point on the Pareto-front 604 resulting from optimizing the Min F(x) optimization problem with the weighted aggregated single objectives 518. For example, for the set of x, i.e., $\{x_1, x_2, \ldots x_n\}$ that denotes the set of Pareto-optimal solutions 602, then the Pareto-front 604 includes the set of objective values on these Pareto-optimal solutions 602. As such, the Pareto-front 604 will be defined by the set of $\{F(x_1), F(x_2), \ldots F(x_n)\}$, where each objective value F(x) is a vector of the objectives 508 that need to be optimized (i.e., maximized or minimized). For example, in the instance of the bi-objective problem, each objective value F(x) is a vector [$f_1(x)$, $f_2(x)$], the points are plotted on the Pareto-front 604 of the two-dimensional graph 600. While the example embodiment discussed herein is a bi-objective optimization problem Min F(x)=[$f_1(x)$, $f_2(x)$], optimization problems of any number of objectives and dimensions may be resolved. In some embodiments, tri-objective problems may be resolved and a three-dimensional display presented to the user on the GUI 506 for action by the user. Those optimization problems in excess of three dimensions and objectives may be resolved and the results presented to the user in the form of a table or spreadsheet. Accordingly, there are no limitations on the number of objectives that may be optimized simultaneously.

The Pareto-optimal solutions 602 are presented to the user as an output 538 that includes the Pareto-front 604 with the corresponding ML pipelines 460 such that the user may interact with the output 538 to either select the most appropriate ML pipeline 460 that optimizes the objectives, possibly reinitiate the process, or further refine the results (discussed further below). The Pareto-optimal solutions 602 defining the Pareto-front 604 include two Pareto-optimal solutions 640 and 642 that appear to provide the most optimum ML pipelines 460. For example, the solutions 640 and 642 appear to provide the optimum balances between a minimum objective value for $f_1(x)$ in solution 640, a minimum objective value for $f_2(x)$ in solution 642, where the not minimum value for $f_1(x)$ in solution 642 and the not minimum value for $f_2(x)$ in solution 640 may be acceptable.

Figure 7:
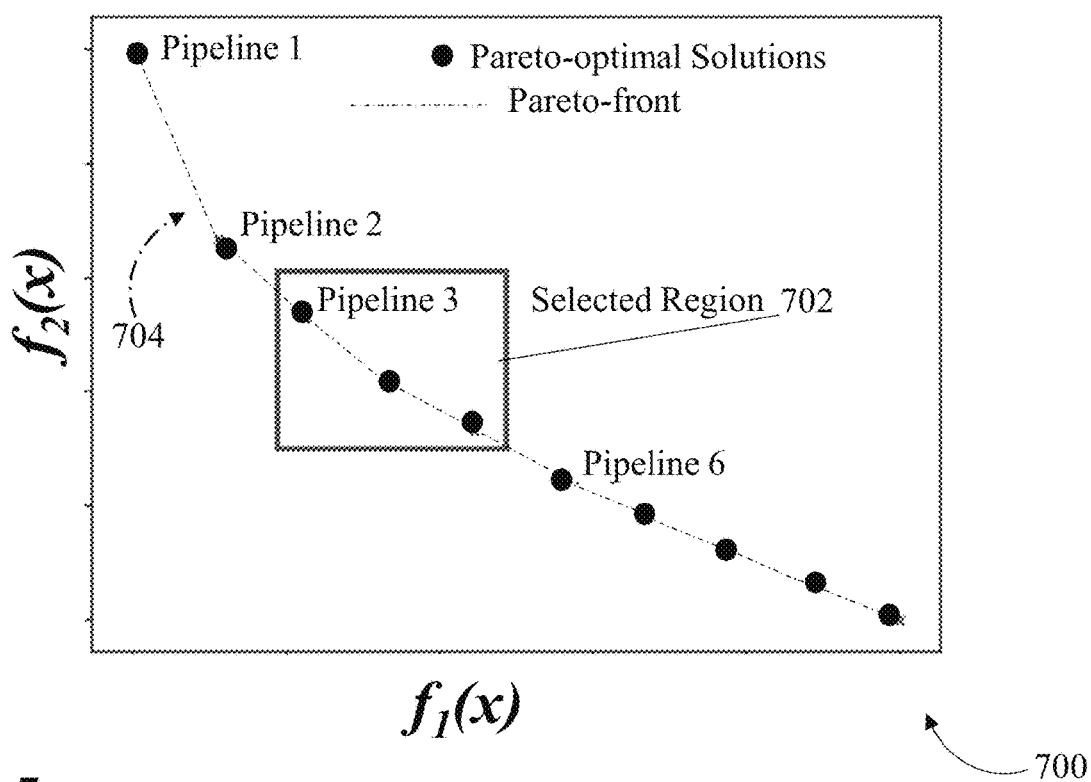
FIG. 7 is a graphical representation illustrating Pareto-front refinement, in accordance with some embodiments of the present disclosure.

Referring to FIG. 7, a graphical representation 700 is provided illustrating Pareto-front refinement. In some embodiments, refinement of the solutions illustrated in FIG. 6 may be executed. In some embodiments, the user may select a region 702 in the Pareto-front 704 for further refinement. In general, further multi-objective optimization is performed to generate additional pipelines within the selected region 702 and the selection of the region results in additional constraints for each objective $f_i$. Such additional constraints may take the form of $l_i < f_i < u_i$, where l represents a lower bound defined by the selected region 702, u represents an upper bound defined by the selected region 702, and i=1 to n, such that the constraints for $f_1$ are $l_1$ and $u_1$, for $f_2$ the constraints are $l_2$ and $u_2$, etc. There are two cases to be examined, i.e., a first case where the single objective joint optimization module 526 supports the new constraints and a second case where the single objective joint optimization module 526 does not support the new constraints.

In the first case, the new constraints are transmitted to the single objective joint optimization module 526 to execute the single objective optimization operations as previously discussed with these constraints as it executed the previously discussed operation with the initial constraints. The single objective joint optimization module 526 will generate additional Pareto-optimal solutions where those new constraints are met, i.e., the additional Pareto-optimal solutions are positioned on the Pareto-front 704 within the selected region 702.

In the second case where the single objective joint optimization module 526 does not support the new constraints, the additional constraints are added to the weighted aggregated single objective 518 in the form of penalty terms. In one embodiment, the modified weighted aggregated single objective 518 is formulated as $f\_ag(x)=\Sigma_i(w_i*f_i(x)+\rho_i L_i(x, l_i, u_i)$, where $\rho_i$ is a penalty coefficient, and $L_i$ is a penalty function within the constraints of x, $l_i$, and $u_i$ that are defined as previously discussed. In some embodiments, the penalty coefficient is a large scaler value, e.g., and without limitation, $10^4$. The penalty coefficient $\rho_i$ may require particular subject matter expertise to be defined; however, the value need be defined only once for the optimization operations. In general, the greater the constraint violation, the greater the penalty.

A more specific example penalty mechanism is a "max penalty (exact)" function that may be defined as $f\_ag_m(x)=\Sigma_i(w_i*f_i(x)+\rho_i(\max(fi(x)-u_i, 0)^2+\max(l_i-fi(x), 0)^2))$ that is a consequence of summing over all possibilities of the objectives. In general, the expression $f\_ag_m$ is configured to generate the penalty value if the lower $(l_i)$ and upper $(u_i)$ constraints are violated. For example, if $f_i$ is less than $l_i$, then a penalty of $(l_i-f_i)$ should be applied. Similarly, if the $f_i$ is greater than $u_i$, then a penalty of $(f_i-u_i)$ should be applied.

Another specific example penalty mechanism is an Augmented Lagrangian function that may be defined as $F\_ag_{AL}(x)=\Sigma_i(w_i*f_i(x)+\gamma_i(f_i(x)-u_i)+\eta_i(l_i-f_i(x))+\rho_i((f_i(x)-u_i)^2+(l_i-f_i(x))^2))$, where the coefficients $\gamma_i$ and $\eta_i$ are Langrange parameters that are positive scalers, are updated iteratively as the optimization process proceeds, and are chosen as algorithmic safeguards for enhanced performance. The additional penalty terms beyond those found in the expression $f\_ag_m$ are defined as $\gamma_i(fi(x)-u_i)+\eta_i(l_i-fi(x))$. In general, the Augmented Lagrangian method based on the expression $f\_ag_{AL}$ is mathematically superior to the earlier described max penalty method based on $f\_ag_m$. Accordingly, refinement of the resultant Pareto-front is facilitated.

The system, computer program product, and method as disclosed herein facilitates overcoming the disadvantages and limitations of known automated machine learning systems with respect to multi-objective optimization through performing multi-objective automated machine learning, and, more specifically, through identifying a plurality of machine learning pipelines as Pareto-optimal solutions to optimize a plurality of objectives. Such performing multi-objective optimization over the full ML pipeline includes optimizing the data transformers, the hyperparameters, and the ML models. The multi-objective optimization solutions proposed herein also incorporate user feedback for performing the optimizations. Also, the multi-objective optimization solutions proposed herein are agnostic to the number of dimensions (i.e., objectives), the nature of the ML pipelines, the transformers, the ML models, and the structure or gradients of the objectives since the multi-objective optimization solutions are generalizable without mandating any subject matter expertise. Moreover, the multi-objective optimization solutions proposed herein are configured to execute optimization operations on "opaque box" objectives that may be user-generated. In addition, as an improvement over known optimization systems that do not consider the full ML pipeline including the transformers and models have a smaller search space compared to the optimization systems disclosed herein that search through the full ML pipeline. Therefore, for optimization systems as disclosed herein, the best set of ML pipelines are determine from this large search space. However, the methods disclosed herein that search over the entire ML pipeline (transformers and models) estimate a better Pareto-front compared to systems that only search over the model ignoring the transformers. Accordingly, significant improvements to known multi-objective automated machine learning systems are realized through the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer system comprising:
   one or more processing devices and at least one memory device operably coupled to the one or more processing devices, the one or more processing devices are configured to:
   receive input data directed toward one or more subjects of interest;
   determine a plurality of objectives to be optimized;
   ingest at least a portion of the input data through one or more machine learning (ML) models;

apply a weight to each of the plurality of objectives, thereby to generate a plurality of weighted objectives, thereby to generate a plurality of weighted aggregated single objectives;

determine a plurality of Pareto optimal solutions, thereby defining a plurality of ML pipelines that optimize the plurality of weighted aggregated single objectives, wherein the Pareto optimal solutions are utilized to graphically define a Pareto-front curve which is displayed to a user in a graphical user interface;

identify at least a portion of the Pareto-front curve to be refined based on a plurality of additional constraints identified by the user by selecting at least a portion of the Pareto-front curve in the graphical user interface for at least one or more of the plurality of objectives to be optimized;

determine whether the plurality of additional constraints identified are supported or not supported for generating a plurality of additional single objective optimizations without modifying the plurality of weighted aggregated single objectives;

determine a plurality of additional Pareto-optimal solutions, wherein the Pareto-front curve is refined based on the plurality of additional Pareto-optimal solutions; and select one ML pipeline from the plurality of ML pipelines.

2. The system of claim 1, wherein the one or more processing devices are further configured to:
select one or more opaque box objectives; and
select one or more objectives of the plurality of objectives that are user-customized.

3. The system of claim 1, the one or more processing devices are further configured to:
define each ML pipeline of the plurality of ML pipelines comprising for each ML pipeline of the plurality of ML pipelines:
select one or more transformers;
select a ML model from the one or more ML models; and
sequentially configure the one or more transformers and the selected ML model.

4. The system of claim 1, wherein the one or more processing devices are further configured to:
apply a first weight to a first objective of the plurality of objectives; and
apply one or more second weights to one or more second respective objectives of the plurality of objectives, wherein a sum of the first weight and the one or more second weights is unity.

5. The system of claim 4, wherein the one or more processing devices are further configured to:
initiate a first iteration of the determining a plurality of Pareto-optimal solutions comprising:
define a first aggregated single objective;
determine a first Pareto-optimal solution from the first aggregated single objective, the first Pareto-optimal solution including one or more first objective values; and
define a first ML pipeline of the plurality of ML pipelines through the first Pareto-optimal solution.

6. The system of claim 5, wherein the one or more processing devices are further configured to:
initiate a second iteration of the determining a plurality of Pareto-optimal solutions, comprising:

apply a third weight to the first objective of the plurality of objectives;
apply one or more fourth weights to the one or more second respective objectives of the plurality of objectives, wherein a sum of the third weight and the one or more fourth weights is unity, and wherein the first weight is different from the third weight and the one or more second weights are different from the one or more fourth weights;
determine a second Pareto-optimal solution including one or more second objective values; and
define a second ML pipeline.

7. The system of claim 6, wherein the one or more processing devices are further configured to:
apply user-selected weights;
apply weights through a uniform weight generation scheme; and
automatically determine the first weight, the one or more second weights, and automatically determine the third weight and the one or more fourth weights at least partially based on the one or more first objective values.

8. The system of claim 6, wherein the one or more processing devices are further configured to:
define a second aggregated single objective that is different from the first aggregated single objective.

9. The system of claim 1, wherein the one or more processing devices are further configured to:
refine at least a portion of the Pareto-front curve comprising:
determine at least one of the plurality of the additional constraints are supported for generating a plurality of additional single objective optimizations without modifying the plurality of weighted aggregated single objectives; and
determine by the plurality of additional Pareto-optimal solutions, thereby defining a plurality of additional ML pipelines that optimize the plurality of additional aggregated single objectives.

10. The system of claim 1, wherein the one or more processing devices are further configured to:
refine at least a portion of the Pareto-front curve comprising:
determine at least one of the plurality of the additional constraints are not supported for generating a plurality of additional single objective optimizations without modifying the plurality of weighted aggregated single objectives;
modify the plurality of weighted aggregated single objectives with one or more penalty terms; and
determine by the plurality of additional Pareto-optimal solutions, thereby to define a plurality of additional ML pipelines that optimize the plurality of additional weighted and modified aggregated single objectives.

11. A computer program product, comprising:
one or more computer readable storage media; and
program instructions collectively stored on the one or more computer storage media, the program instructions comprising:
program instructions to receive input data directed toward one or more subjects of interest;
program instructions to determine a plurality of objectives to be optimized;
program instructions to apply a weight to each of the plurality of objectives, thereby to generate a plurality of weighted objectives, thereby to generate a plurality of weighted aggregated single objectives;

program instructions to determine a plurality of Pareto optimal solutions, thereby defining a plurality of ML pipelines that optimize the plurality of weighted aggregated single objectives, wherein the Pareto optimal solutions are utilized to graphically define a Pareto-front curve which is displayed to a user in a graphical user interface;

program instructions to identify at least a portion of the Pareto-front curve to be refined based on a plurality of additional constraints identified by the user by selecting at least a portion of the Pareto-front curve in the graphical user interface for at least one or more of the plurality of objectives to be optimized;

program instructions to determine whether the plurality of additional constraints identified are supported or not supported for generating a plurality of additional single objective optimizations without modifying the plurality of weighted aggregated single objectives; and program instructions to determine whether the plurality of additional constraints identified are supported or not supported for generating a plurality of additional single objective optimizations without modifying the plurality of weighted aggregated single objectives;

program instructions to determine a plurality of additional Pareto-optimal solutions, wherein the Pareto-front curve is refined based on the plurality of additional Pareto-optimal solutions; and program instructions to select one ML pipeline from the plurality of ML pipelines.

12. A computer-implemented method comprising:
receiving input data directed toward one or more subjects of interest;
determining a plurality of objectives to be optimized;
ingesting at least a portion of the input data through one or more machine learning (ML) models;
applying a weight to each of the plurality of objectives, thereby to generate a plurality of weighted objectives, thereby to generate a plurality of weighted aggregated single objectives;
determining a plurality of Pareto optimal solutions, thereby defining a plurality of ML pipelines that optimize the plurality of weighted aggregated single objectives, wherein the Pareto optimal solutions are utilized to graphically define a Pareto-front curve which is displayed to a user in a graphical user interface;
identifying at least a portion of the Pareto-front curve to be refined based on a plurality of additional constraints identified by the user by selecting at least a portion of the Pareto-front curve in the graphical user interface for at least one or more of the plurality of objectives to be optimized;
determining whether the plurality of additional constraints identified are supported or not supported for generating a plurality of additional single objective optimizations without modifying the plurality of weighted aggregated single objectives;
determining a plurality of additional Pareto-optimal solutions, wherein the Pareto-front curve is refined based on the plurality of additional Pareto-optimal solutions; and
selecting one ML pipeline from the plurality of ML pipelines.

13. The method of claim 12, wherein determining the plurality of objectives to be optimized comprises one or more of:
selecting one or more opaque box objectives; and
selecting one or more objectives of the plurality of objectives that are user-customized.

14. The method of claim 12, further comprising:
defining each ML pipeline of the plurality of ML pipelines comprising, for each ML pipeline of the plurality of ML pipelines:
selecting one or more transformers;
selecting a ML model from the one or more ML models; and
sequentially configuring the one or more transformers and the selected ML model.

15. The method of claim 12, wherein the applying a weight to each objective of the plurality of objectives comprises:
applying a first weight to a first objective of the plurality of objectives; and
applying one or more second weights to one or more second respective objectives of the plurality of objectives, wherein a sum of the first weight and the one or more second weights is unity.

16. The method of claim 15, wherein applying the first weight and applying the one or more second weights comprises:
initiating a first iteration of the determining a plurality of Pareto-optimal solutions comprising:
defining a first aggregated single objective;
determining a first Pareto-optimal solution from the first aggregated single objective, the first Pareto-optimal solution including one or more first objective values; and
defining a first ML pipeline of the plurality of ML pipelines through the first Pareto-optimal solution.

17. The method of claim 16, further comprising:
initiating a second iteration of the determining a plurality of Pareto-optimal solutions, comprising:
applying a third weight to the first objective of the plurality of objectives;
applying one or more fourth weights to the one or more second respective objectives of the plurality of objectives, wherein a sum of the third weight and the one or more fourth weights is unity, and wherein the first weight is different from the third weight and the one or more second weights are different from the one or more fourth weights;
determining a second Pareto-optimal solution including one or more second objective values; and
defining a second ML pipeline.

18. The method of claim 17, wherein applying one or more of the first weight, the one or more second weights, the third weight, and the one or more fourth weights comprises one or more of:
applying user-selected weights;
applying weights through a uniform weight generation scheme; and
automatically determining the first weight, the one or more second weights, and automatically determining the third weight and the one or more fourth weights at least partially based on the one or more first objective values.

19. The method of claim 17, wherein the applying a third predetermined weight and the applying one or more fourth predetermined weights comprises:
defining a second aggregated single objective that is different from the first aggregated single objective.

20. The method of claim 12, wherein determining the plurality of Pareto-optimal solutions comprises generating a Pareto-front, the method further comprising:
refining at least a portion of the Pareto-front curve comprising:
determining at least one of the plurality of the additional constraints are supported for generating a plurality of additional single objective optimizations without modifying the plurality of weighted aggregated single objectives; and
determine by the plurality of additional Pareto-optimal solutions, thereby defining a plurality of additional ML pipelines that optimize the plurality of additional aggregated single objectives.

21. The method of claim 12, wherein determining the plurality of Pareto-optimal solutions comprises generating a Pareto-front, the method further comprising:
refining at least a portion of the Pareto-front curve comprising:
determining at least one of the plurality of the additional constraints are not supported for generating a plurality of additional single objective optimizations without modifying the plurality of weighted aggregated single objectives;
modifying the plurality of weighted aggregated single objectives with one or more penalty terms; and
determine by the plurality of additional Pareto-optimal solutions, thereby defining a plurality of additional ML pipelines that optimize the plurality of additional weighted and modified aggregated single objectives.

22. A computer-implemented method comprising:
receiving input data directed toward one or more subjects of interest;
determining a plurality of objectives to be optimized;
ingesting at least a portion of the input data through one or more machine learning (ML) models;
applying a first weight to a first objective of the plurality of objectives, and applying one or more second weights to one or more second respective objectives of the plurality of objectives, the first weight and the one or more second weights are selected through a uniform weight generation scheme, wherein a sum of the first weight and the one or more second weights is unity, thereby generating a first weighted objective and one or more second weighted objectives;
aggregating the first weighted objective and the one or more second weighted objectives into a first weighted aggregated single objective;
determining a first Pareto-optimal solution from the first weighted aggregated single objective;
defining a first ML pipeline through the first Pareto-optimal solution, wherein the first ML pipeline optimizes the first weighted aggregated single objective;
applying a third weight to the first objective of the plurality of objectives, and applying one or more fourth weights to the one or more second respective objectives of the plurality of objectives, the third weight and the one or more fourth weights are user-selected, wherein a sum of the third weight and the one or more fourth weights is unity, and wherein the first weight is different from the third weight and the one or more second weights are different from the one or more fourth weights, thereby generating a third weighted objective and one or more fourth weighted objectives;
aggregating the third weighted objective and the one or more fourth weighted objectives into a second weighted aggregated single objective;
determining a second Pareto-optimal solution from the second weighted aggregated single objective;
defining a second ML pipeline through the second Pareto-optimal solution, wherein the second ML pipeline optimizes the second weighted aggregated single objective;
utilizing the first Pareto-optimal solution and the second Pareto-optimal solution to graphically define a Pareto-front curve which is displayed to a user in a graphical user interface;
identify at least a portion of the Pareto-front curve to be refined based on a plurality of additional constraints identified by the user by selecting at least a portion of the Pareto-front curve in the graphical user interface for at least one or more of the plurality of objectives to be optimized; and
selecting one ML pipeline from the first and second ML pipelines.

23. A computer-implemented method comprising:
receiving input data directed toward one or more subjects of interest;
determining a plurality of objectives to be optimized;
ingesting at least a portion of the input data through one or more machine learning (ML) models;
applying a first weight to a first objective of the plurality of objectives, and applying one or more second weights to one or more second respective objectives of the plurality of objectives, the first weight and the one or more second weights are automatically determined, wherein a sum of the first weight and the one or more second weights is unity, thereby generating a first weighted objective and one or more second weighted objectives;
aggregating the first weighted objective and the one or more second weighted objectives into a first weighted aggregated single objective;
determining a first Pareto-optimal solution from the first weighted aggregated single objective, the first Pareto-optimal solution including one or more first objective values;
defining a first ML pipeline through the first Pareto-optimal solution, wherein the first ML pipeline optimizes the first weighted aggregated single objective;
applying a third weight to the first objective of the plurality of objectives, and applying one or more fourth weights to the one or more second respective objectives of the plurality of objectives, the third weight and the one or more fourth weights are automatically determined at least partially based on the one or more first objective values, wherein a sum of the third weight and the one or more fourth weights is unity, and wherein the first weight is different from the third weight and the one or more second weights are different from the one or more fourth weights, thereby generating a third weighted objective and one or more fourth weighted objectives;
aggregating the third weighted objective and the one or more fourth weighted objectives into a second weighted aggregated single objective;
determining a second Pareto-optimal solution from the second weighted aggregated single objective;
defining a second ML pipeline through the second Pareto-optimal solution, wherein the second ML pipeline optimizes the second weighted aggregated single objective;

utilizing the first Pareto-optimal solution and the second Pareto-optimal solution to graphically define a Pareto-front curve which is displayed to a user in a graphical user interface;
identify at least a portion of the Pareto-front curve to be refined based on a plurality of additional constraints identified by the user by selecting at least a portion of the Pareto-front curve in the graphical user interface for at least one or more of the plurality of objectives to be optimized; and
selecting one ML pipeline from the first and second ML pipelines.

* * * * *